US008104006B2

(12) United States Patent
Kariat et al.

(10) Patent No.: US 8,104,006 B2
(45) Date of Patent: Jan. 24, 2012

(54) METHOD AND APPARATUS FOR THERMAL ANALYSIS

(75) Inventors: Vinod Kariat, Sunnyvale, CA (US); Igor Keller, Pleasanton, CA (US); Eddy Pramono, Santa Clara, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 405 days.

(21) Appl. No.: 12/024,002

(22) Filed: Jan. 31, 2008

(65) Prior Publication Data
US 2009/0199140 A1 Aug. 6, 2009

(51) Int. Cl.
*G06F 17/50* (2006.01)

(52) U.S. Cl. .......................... 716/109; 716/100

(58) Field of Classification Search ................ 716/1, 4, 716/100, 109
See application file for complete search history.

(56) References Cited

U.S. PATENT DOCUMENTS

| | | | | |
|---|---|---|---|---|
| 6,842,714 | B1* | 1/2005 | Acar et al. | 702/136 |
| 6,895,354 | B2 | 5/2005 | Matsuyama et al. | |
| 7,366,997 | B1* | 4/2008 | Rahmat et al. | 716/111 |
| 7,548,792 | B2 | 6/2009 | Kumano et al. | |
| 7,626,144 | B2 | 12/2009 | Merzliakov | |
| 2004/0073397 | A1 | 4/2004 | Matsuyama et al. | |
| 2005/0044515 | A1* | 2/2005 | Acar et al. | 716/5 |
| 2005/0102117 | A1* | 5/2005 | Habitz | 702/133 |
| 2006/0039114 | A1* | 2/2006 | Hamann et al. | 361/704 |
| 2006/0095493 | A1 | 5/2006 | Kumano et al. | |
| 2007/0168151 | A1* | 7/2007 | Kernahan et al. | 702/132 |
| 2007/0206654 | A1 | 9/2007 | Merzliakov | |
| 2007/0244676 | A1* | 10/2007 | Shang et al. | 703/2 |
| 2008/0026493 | A1 | 1/2008 | Shakouri et al. | |
| 2008/0072182 | A1 | 3/2008 | He et al. | |
| 2008/0087478 | A1* | 4/2008 | Stalford | 180/65.1 |
| 2008/0168406 | A1* | 7/2008 | Rahmat et al. | 716/2 |
| 2008/0183322 | A1 | 7/2008 | Kumano et al. | |
| 2008/0244278 | A1* | 10/2008 | Monferrer et al. | 713/300 |
| 2009/0024969 | A1* | 1/2009 | Chandra | 716/5 |
| 2009/0199140 | A1* | 8/2009 | Kariat et al. | 716/5 |
| 2009/0319964 | A1* | 12/2009 | Kariat et al. | 716/4 |
| 2009/0319965 | A1* | 12/2009 | Kariat et al. | 716/4 |
| 2010/0023903 | A1* | 1/2010 | Pramono et al. | 716/5 |

OTHER PUBLICATIONS

Zienkiewicz, O.C., "The Finite Element Method" $3^{rd}$ ed., 1977, pp. 423-449, McGraw-Hill Book Company (UK) Limited, Berkshire, England.
Updated portions of prosecution history of U.S. Appl. No. 12/144,651, mailed Jan. 11, 2011, Kariat, Vinod, et al.
Portions of prosecution history of U.S. Appl. No. 12/416,793, mailed Jan. 5, 2011, Karait, Vinod, et al.
Portions of prosecution history of U.S. Appl. No. 12/144,651, mailed Oct. 25, 2010, Kariat, Vinod, et al.
Updated portions of prosecution history of U.S. Appl. No. 12/144,651, mailed May 10, 2011, Kariat, Vinod, et al.

(Continued)

*Primary Examiner* — Suchin Parihar
(74) *Attorney, Agent, or Firm* — Adeli & Tollen LLP

(57) ABSTRACT

Some embodiments of the invention provide a method for performing thermal analysis of an integrated circuit ("IC") layout that includes numerous circuit modules. In some embodiments, the method initially defines several power dissipation equations that express the temperature dependence of the power dissipation for several circuit modules. In some embodiments, the power dissipation equations express a non-linear relationship between power dissipation and temperature. The method defines a heat flow equation based on the specified power dissipation equations. The method then solves the heat flow equation to identify a temperature distribution for the design layout.

29 Claims, 10 Drawing Sheets

OTHER PUBLICATIONS

Portions of prosecution history of U.S. Appl. No. 12/180,490, mailed May 18, 2011, Pramono, Eddy, et al.

Updated portions of prosecution history of U.S. Appl. No. 12/416,793, mailed May 5, 2011, Kariat, Vinod, et al.

Goplen, Brent, et al., "Thermal Via Placement in 3D ICs", Proceedings of the 2005 International Symposium on Physical Design (ISPD'05), Apr. 3-6, 2005, pp. 167-174, ACM, San Francisco, CA, USA.

* cited by examiner

METHOD AND APPARATUS FOR THERMAL ANALYSIS

FIELD OF THE INVENTION

Some embodiments of the invention provide a method for performing thermal analysis.

BACKGROUND OF THE INVENTION

An integrated circuit ("IC") is a device (e.g., semiconductor device) that includes many electronic components, such as transistors, resistors, diodes, etc. These electronic components can be connected together to form multiple circuit components such as gates, cells, memory units, arithmetic units, controllers, decoders, etc. An IC includes multiple layers of wiring that interconnect its electronic and circuit components.

Design engineers design IC's by transforming logical or circuit descriptions of the IC's components into geometric descriptions, called layouts. IC layouts typically include (1) circuit modules (i.e., geometric representations of electronic or circuit IC components) with pins, and (2) interconnect lines (i.e., geometric representations of wiring) that connect the pins of the circuit modules. A collection of pins that need to be connected is typically called a net.

To create layouts, design engineers often use electronic design automation ("EDA") applications. These applications provide sets of computer-based tools for creating, editing, and analyzing IC design layouts. Examples of such tools include (1) standard cell libraries that provide numerous cells that can be instantiated as circuit modules in a design, (2) placement tools that define the location of the various circuit modules in a layout, (3) routing tools that define the wiring between the circuit modules, and (4) verification tools that verify that the designed layout will meet design operation requirements.

Thermal analysis tools are one type of verification tools that are used currently. Prior thermal analysis tools dealt mostly with the thermal analysis properties of the chip packages and often ignored thermal properties on the chip. These prior tools were mainly concerned about the total power dissipation of the chip, and about whether a specific package was sufficient to cool a given chip. In these tools, the chip often was treated as a lumped heat source, while the model for the package was very detailed, including details regarding airflow around the package.

In recent years, on-chip thermal analysis has become more important as the number of active devices and the total amount of on-chip power has increased due to larger chip sizes and/or smaller device sizes. This analysis has also become more important with the increase of the power density on the chips due to scaling. The increase in low power chips for mobile devices has also increased the demand for on-chip analysis. In low power chips, leakage current is a big contributor to power consumption. Often the techniques that are used in low power consuming chips (e.g., turning off areas of the IC) create voltage gradients, which cause leakage current and inaccurate power dissipation analysis.

As illustrated in FIG. 1, leakage current is greatly affected by on-chip temperature variations. In fact, a circular dependency exists between the on-chip temperature, leakage current, and power dissipation. As illustrated in FIG. 2, the leakage current 210 affects the power dissipation 215. As the leakage current 210 rises, the power dissipation 215 also rises along with it. The power dissipation 215 increases the temperature 205, which in turn increases the leakage current. This circular set of dependencies creates the potential for a runaway feedback loop in which the temperature of the IC continually increases with the leakage current.

FIG. 3 illustrates one current approach for performing on-chip thermal analysis for an IC design. Under this approach, a power analysis tool 305 and a thermal analysis tool 315 interact multiple times and repeatedly perform power and thermal analyses until their results begin to converge. Specifically, the power analysis tool 305 initially performs a first power analysis on a particular IC design that is defined by numerous parameters stored in a design database 310. To perform its initial analysis, the power analysis tool 305 assumes some ambient temperature for all circuit modules in the design. The power analysis tool 305 then passes to the thermal analysis tool 315 its initial results, which includes the power dissipated by each circuit module in the design.

The thermal analysis tool 315 then performs a first pass of its thermal analysis by converting the power dissipated by each circuit module into a heat source. This thermal analysis produces an intermediate temperature map 320 for the chip. This thermal map models the temperature distribution through the entire chip. In addition, an average temperature for each instance is available. The temperature for each circuit module is now passed back to power analysis tool 305. The power analysis tool 305 will now recompute the power dissipation of each circuit module based on the new temperatures; in particular, it will compute the leakage power of each circuit module. The new power numbers will now be passed on to the thermal analysis tool 315, which will now recompute a new temperature. After a certain number of iterations, the temperature and leakage will converge, and the iterations will stop at that point. The result of these iterative operations is a final thermal may 325 and a final power report 330.

The main disadvantage of the approach illustrated in FIG. 3 is that the iterations between power analysis and thermal analysis are slow and costly. In addition to the additional run time requirement, the system is also quite complex because of the loose iterations between different components in the system. Accordingly, there is a need for a method that more efficiently performs thermal analysis of an IC design.

SUMMARY OF THE INVENTION

Some embodiments of the invention provide a method for performing thermal analysis of an integrated circuit ("IC") layout that includes numerous circuit modules. In some embodiments, the method initially defines several power dissipation equations that express the temperature dependence of the power dissipation for several circuit modules. In some embodiments, the power dissipation equations express a non-linear relationship between power dissipation and temperature. The method defines a heat flow equation based on the specified power dissipation equations. The method then solves the heat flow equation to identify a temperature distribution for the design layout.

Different embodiments define the power dissipation equations differently. In some embodiments, the power dissipation equation for a circuit module has two components, one that is temperature dependent and one that is not. For instance, in some of these embodiments, the temperature-dependent component of the power dissipation includes the leakage power consumption of the circuit module, while the temperature-independent component includes the switching power of the circuit module.

In some of these embodiments, the leakage power of a circuit module is expressed in terms of a non-linear equation with respect to temperature. Some of these embodiments compute coefficients for the non-linear equation of a circuit module from the leakage power dissipation of the circuit module at two different temperatures. Other embodiments receive such coefficients from a third party (e.g., the manufacturer for the IC design, the developer of a library that contains the macro for the circuit module, etc.).

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

I. Overview

Some embodiments of the invention provide a method for performing thermal analysis of an integrated circuit ("IC") layout that includes numerous circuit modules. In some embodiments, the method initially defines several power-dissipation equations that express the temperature dependence of the power dissipation for several circuit modules. In some embodiments, the power dissipation equations express a non-linear relationship between power dissipation and temperature. The method defines a heat flow equation based on the specified power dissipation equations. The method then solves the heat flow equation to identify a temperature distribution for the design layout.

Different embodiments define the power dissipation equations differently. In some embodiments, the power dissipation equation for a circuit module has two components, one that is temperature dependent and one that is not. For instance, in some of these embodiments, the temperature-dependent component of the power dissipation includes the leakage power consumption of the circuit module, while the temperature-independent component includes the switching power of the circuit module.

In some of these embodiments, the leakage power of a circuit module is expressed in terms of a non-linear equation with respect to temperature. Some of these embodiments compute coefficients for the non-linear equation of a circuit module from the leakage power dissipation of the circuit module at two different temperatures. Other embodiments receive such coefficients from a third party (e.g., the manufacturer for the IC design, the developer of a library that contains the macro for the circuit module, etc.).

Several more detailed embodiments will now be described.

II. Overall Flow

Figure 1:
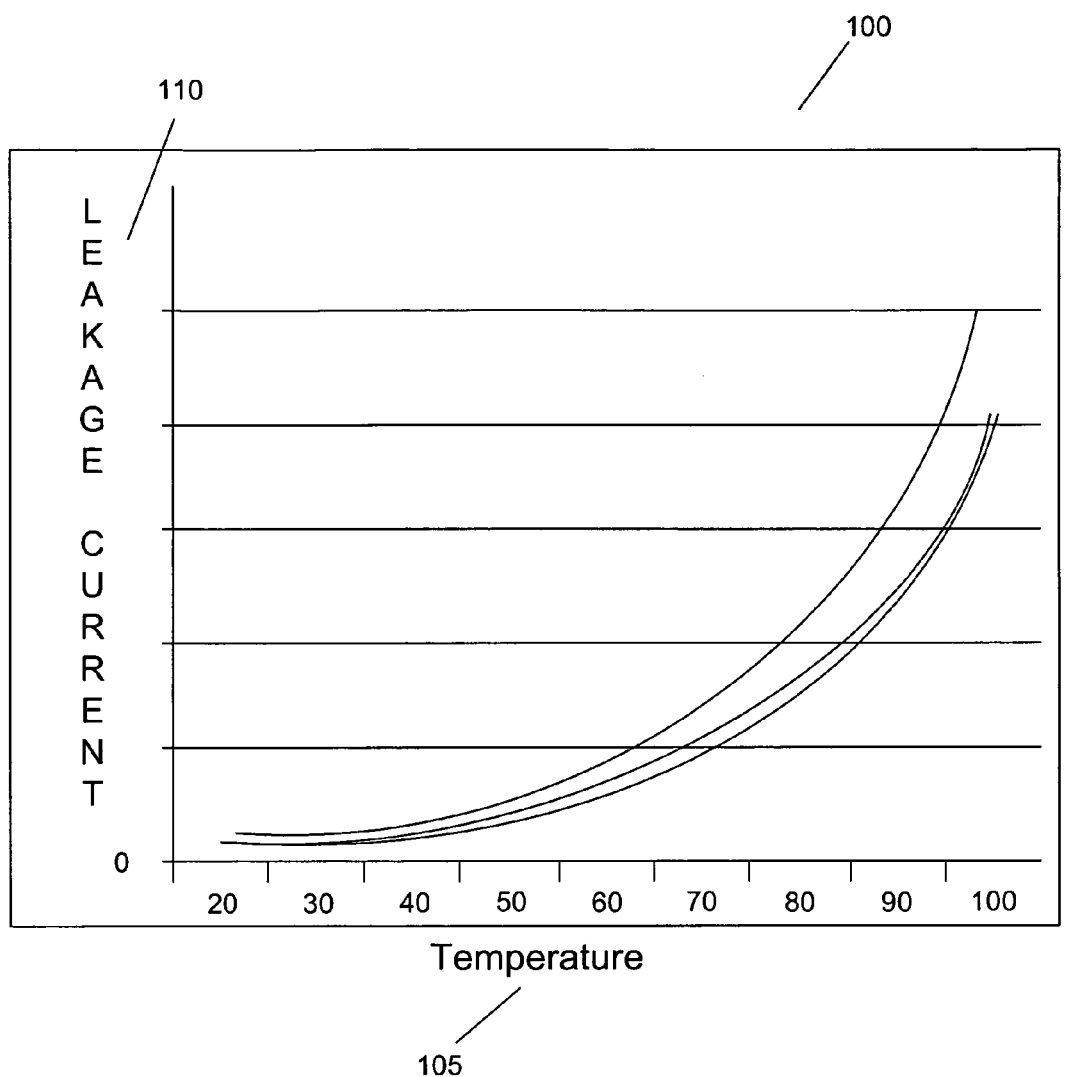
FIG. 1 illustrates that leakage current is greatly affected by on-chip temperature variations.
Figure 2:
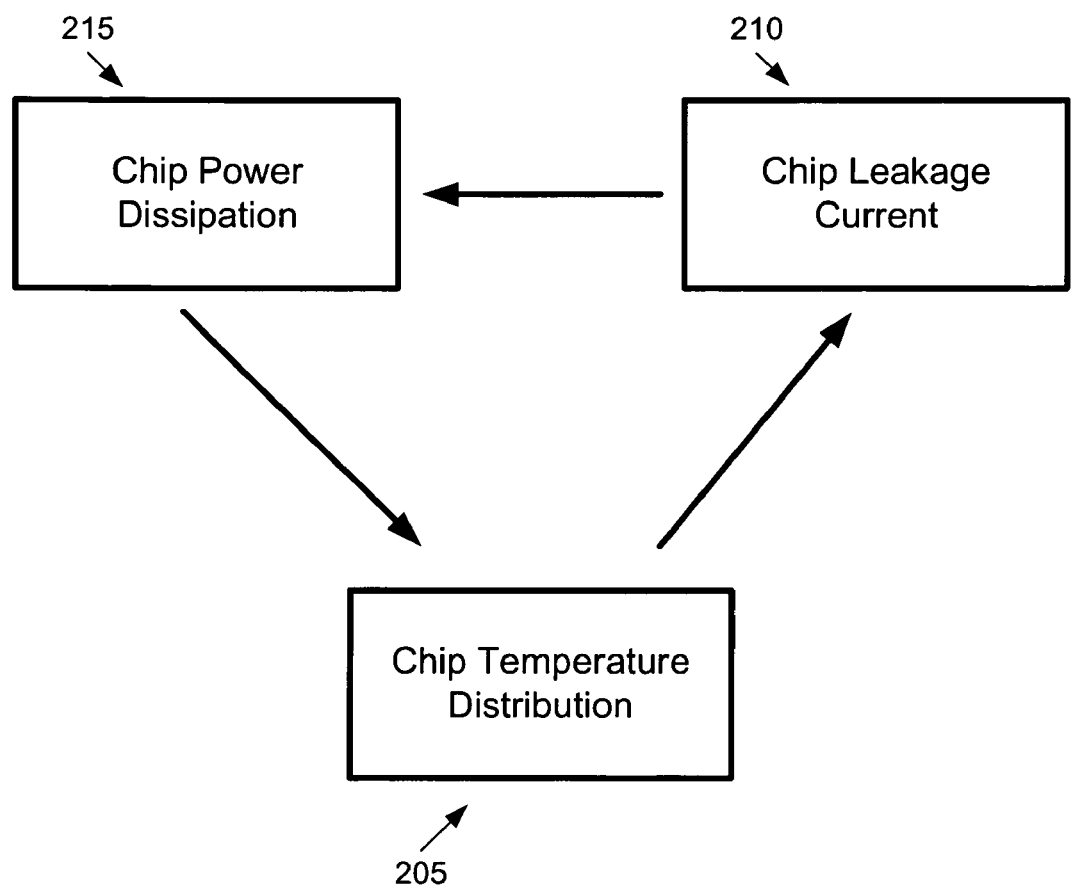
FIG. 2 illustrates that the leakage current affects the power dissipation
Figure 3:
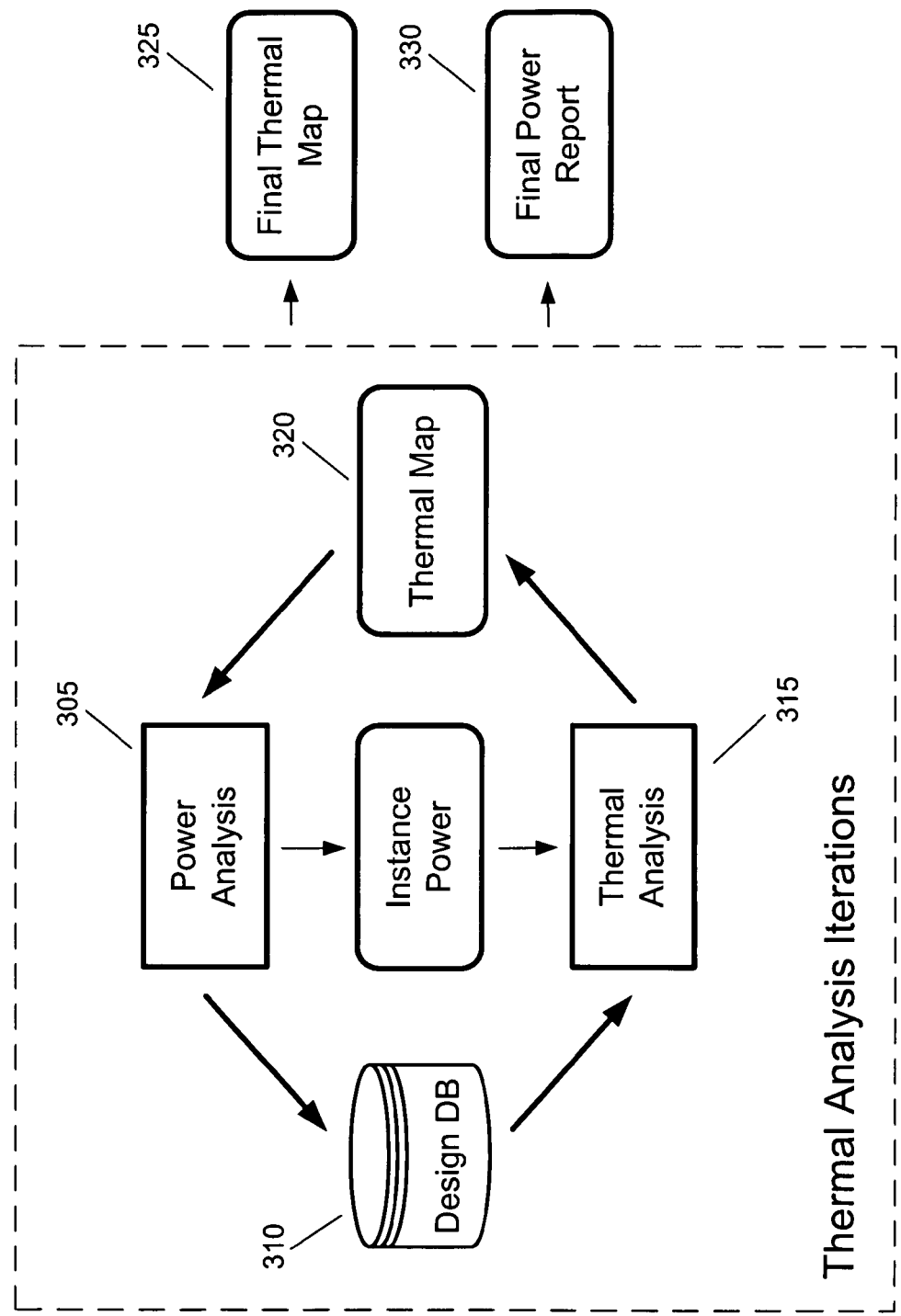
FIG. 3 illustrates one current approach for performing on-chip thermal analysis for an IC design.
Figure 4:
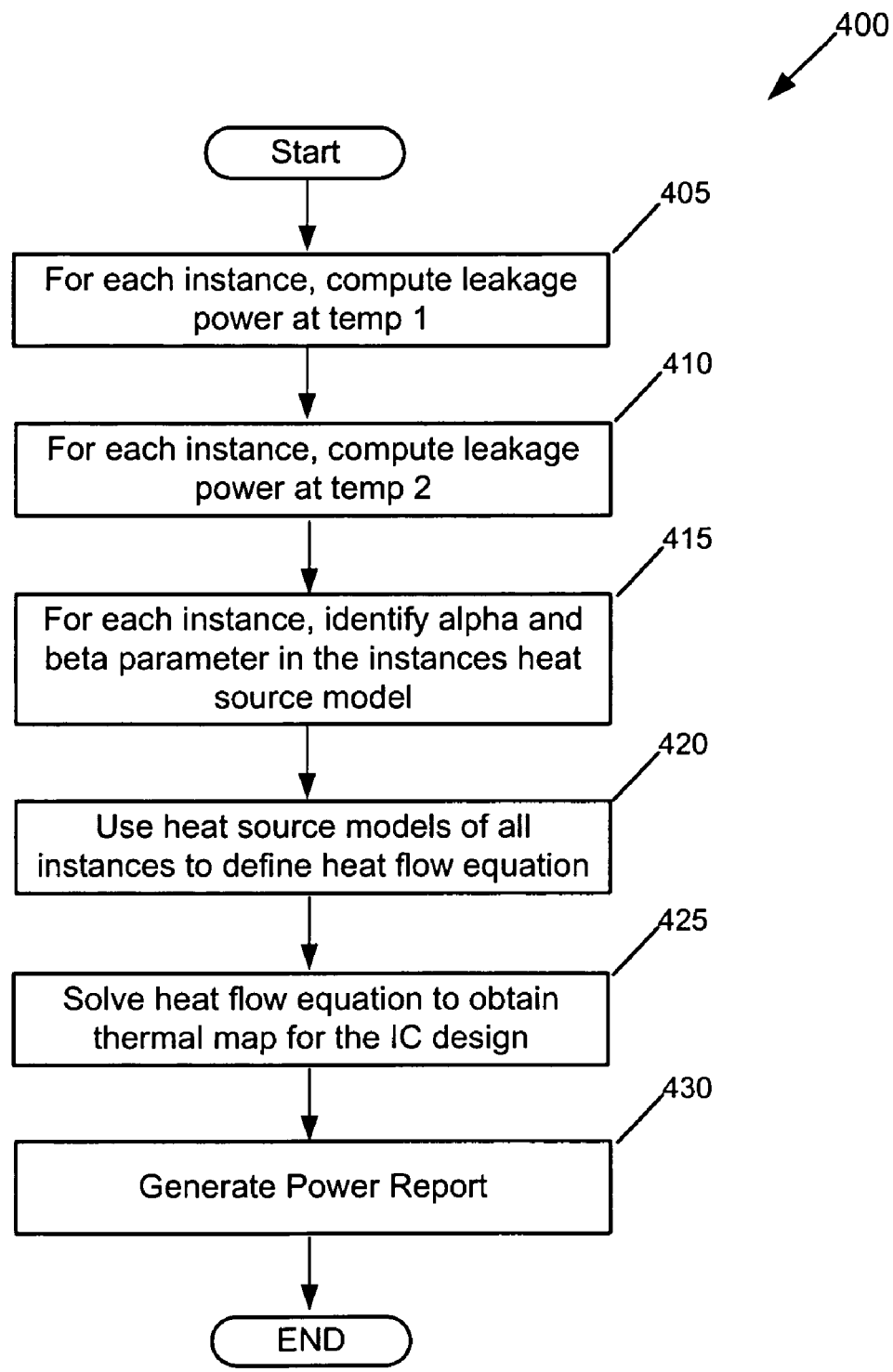
FIG. 4 conceptually illustrates a process that represents the overall flow of some embodiments of the invention.

FIG. 4 conceptually illustrates a process 400 that represents the overall flow of some embodiments of the invention. This process generates a thermal map and a power analysis report for the IC design without iterating multiple times between the power and thermal analysis. In some embodiments, this process is performed by one EDA tool (e.g., a thermal analysis tool), while in other embodiments, several different tools (e.g., two different tools) perform this process.

The process 400 starts when it receives a design layout on which it has to perform thermal analysis. As shown in FIG. 4, the process 400 initially computes (at 405 and 410) the leakage power of each circuit module in the IC design at two different temperatures, $T_1$ and $T_2$. In some embodiments, the two temperatures $T_1$ and $T_2$ bound the temperature domain of interest. In other embodiments, the two temperatures are simply two temperatures that fall within the temperature domain of interest.

In some embodiments, many or all of the circuit modules in the IC design are cells (i.e., small circuits) that come from one or more libraries that were used to design the layout that the process 400 receives. In these embodiments, the process computes the leakage power for each cell at the two different temperatures. In other words, the process does not need to compute the two leakage power values for each instance of a particular cell that is used in the design. Instead, it only needs to compute these values for each particular cell. In this manner, the operations of the process at 405 and 410 can be viewed in some embodiments as generating two different cell leakage-power libraries, where each library is characterized at a different temperature.

If a transistor level description of the cell library is available, this description can be used to compute the power at two temperatures by using circuit simulation. Many circuit simulation programs exist that can perform such computation. Spice simulation programs are one example of such programs.

For each transistor, spice simulation programs often have a spice model and a temperature parameter that describes how the transistor will behave at a particular temperature. By using such models, spice simulation programs can compute leakage power at two different temperatures. For instance, to compute the leakage power at a particular temperature for a particular CMOS inverter with its input state at a logic 0, a spice program would (1) set the input of the inverter to zero volts for a transient period (e.g., a few milliseconds), (2) use the temperature parameters of the CMOS inverter's transistors to compute the average current flow through the inverter at the particular parameter, and (3) multiply the average current flow by the voltage supplied to the inverter, which would typically be $V_{DD}$.

After computing the instance leakage power dissipation of each particular circuit module (e.g., each cell), the process then computes (at 415) the parameters of a non-linear equation that represents the leakage power dissipation of the particular circuit module. Some embodiments use the following exponential equation to represent the leakage power dissipation of a circuit module.

$$LP = \alpha e^{\beta T} \tag{1}$$

In the above equation, LP represents the leakage power, T represents the temperature, and α and β are constants. Taking the natural logarithm of both sides of this equation yields the result that the logarithm of leakage power is a linear function of temperature, as illustrated by the following equation:

$$\ln(LP) = \ln(\alpha) + \beta T \tag{2}$$

Therefore, for each circuit module (e.g., each cell), the α and β coefficients for that module's heat source model can be derived from the leakage power for the module at two temperatures. Specifically, for a particular circuit module (e.g., cell), a first leakage power $LP_1$ at a first temperature $T_1$ and a second leakage power $LP_2$ at a second temperature $T_2$ provides the following two equations:

$$\ln(LP_1) = \ln(\alpha) + \beta T_1, \text{ and} \tag{3}$$

$$\ln(LP_2) = \ln(\alpha) + \beta T_2, \tag{4}$$

which can be solved to provide the two coefficients α and β for the particular circuit module.

Once the two coefficients α and β are computed for each circuit module, the process specifies (at 420) a heat flow equation to express the on-chip temperature in terms of the chip's power consumption. This power consumption includes the leakage power consumption of the circuit modules. In some embodiments, the heat flow equation expresses the temperature-dependent, leakage power consumption of each circuit module by using Equation (1) with the coefficients α and β which were computed at 415. Section III describes the heat flow equation of some embodiments of the invention.

After defining the heat flow equation (at 420), the process solves (at 425) the heat flow equation to obtain a three-dimensional thermal map for the IC design. In some embodiments, the process solves this equation iteratively until it determines that its solutions have started to converge to be within an acceptable threshold. Section IV describes this iterative solving process.

Figure 5:
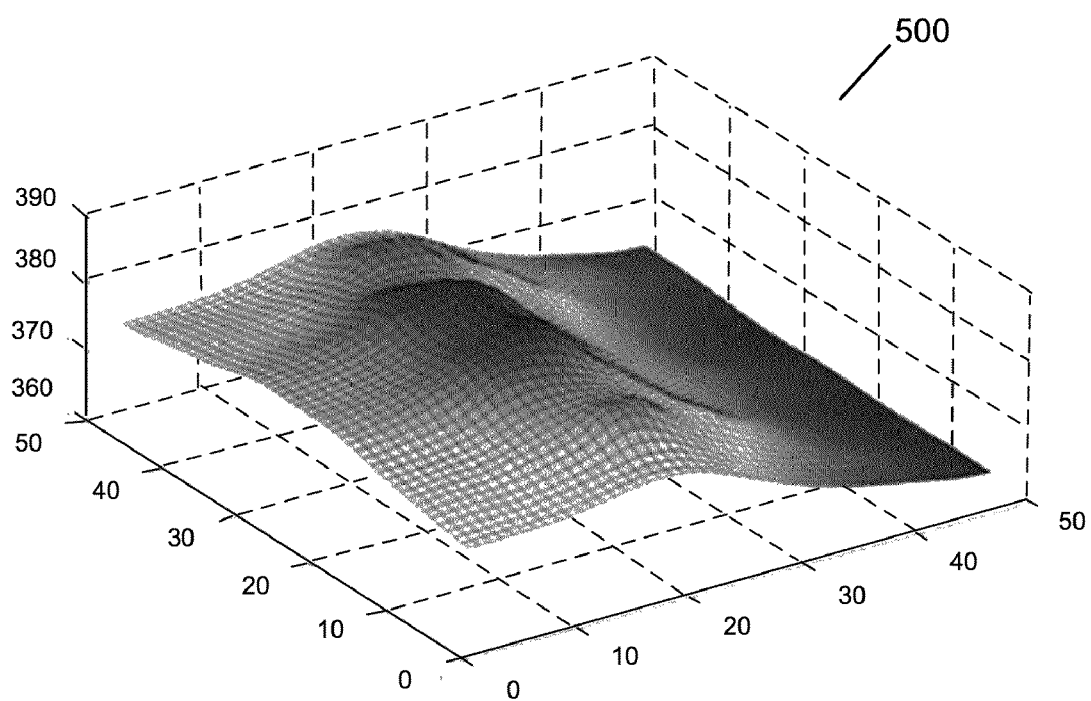
FIG. 5 illustrates a two-dimensional temperature map for one of the layers of an IC.

The solution that is obtained (at 425) for the heat flow equation is a three-dimensional thermal map of the IC. FIG. 5 illustrates a two-dimensional temperature map 500 for one of the layers of the IC. This map plots temperature (along the z-axis) in Kelvin as a function of spatial x and y coordinates on a particular layer of the IC. In some embodiments, this map is color coded to show the different temperatures in different colors, in order to allow visual identification of hot spots on the chip. This map will not only show the temperature at various locations on the IC, but also temperature gradients as well.

After obtaining this map, the process 400 can generate (at 430) a power consumption report for the IC design. This power consumption report provides the overall power consumption of the IC design as well as the power consumption of each circuit module in the IC design. After 430, the process ends.

III. Heat Flow Equation

The heat flow equation in some embodiments is expressed as $$C * T = P(T) \tag{5}$$

In this equation, C is a conductivity matrix that expresses the estimated conductivity of different nodes in the design, T is a temperature vector that expresses the estimated temperature of different nodes in the design, and P(T) is a vector that is related to the estimated power consumption of different nodes in the design.

Different embodiments express the conductivity matrix C and power-related vector P(T) of Equation (5) differently. Below is one finite-element formulation for the problem. Other embodiments might formulate C and P(T) differently for the heat flow Equation (5). Yet other embodiments might use different heat flow equations than Equation (5).

Figure 6:
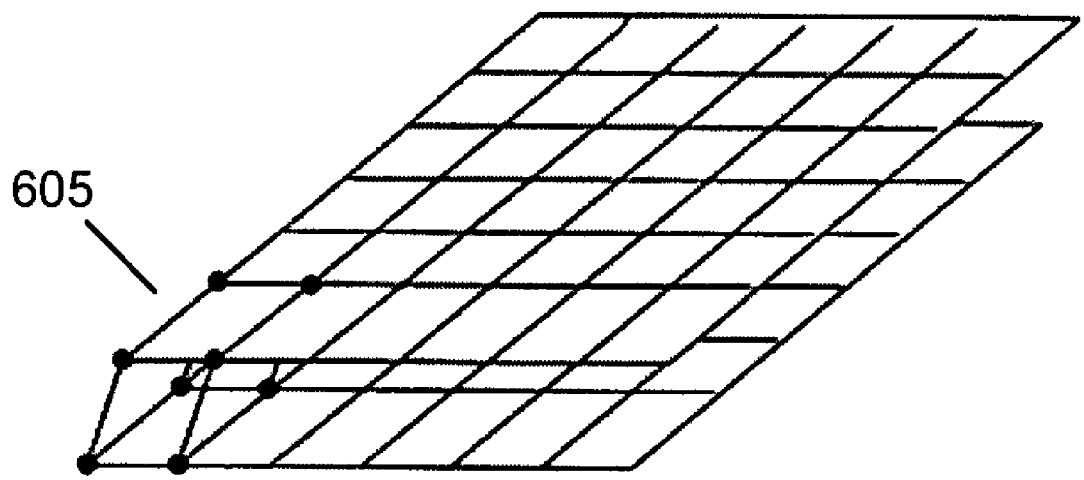
FIG. 6 illustrates a design layout that has been divided in several bricks.

To derive a more manageable finite-element formulation of the heat flow equation, some embodiments divide the IC design into a plurality of bricks 605 of FIG. 6. As shown in this figure, each brick has eight vertices. These vertices are the nodes for which some embodiments express the conductivity matrix C, compute the power-related vector P(T), and calculate the temperature vector T.

These embodiments then express the finite element formulation of the heat flow Equation (5) by specifying the conductivity matrix C as:

$$C_{ij} = \int_\Omega \nabla^T N_i k \nabla N_j d\Omega + \int_{\Gamma_q} N_i h N_j d\Gamma_q \tag{6}$$

and the power-related vector P(T) as:

$$P_i(T) = \int_\Omega N_i g(x,y,z,T) d\Omega + \int_{\Gamma_q} N_i f d\Gamma_q \tag{7}$$

Figure 7:
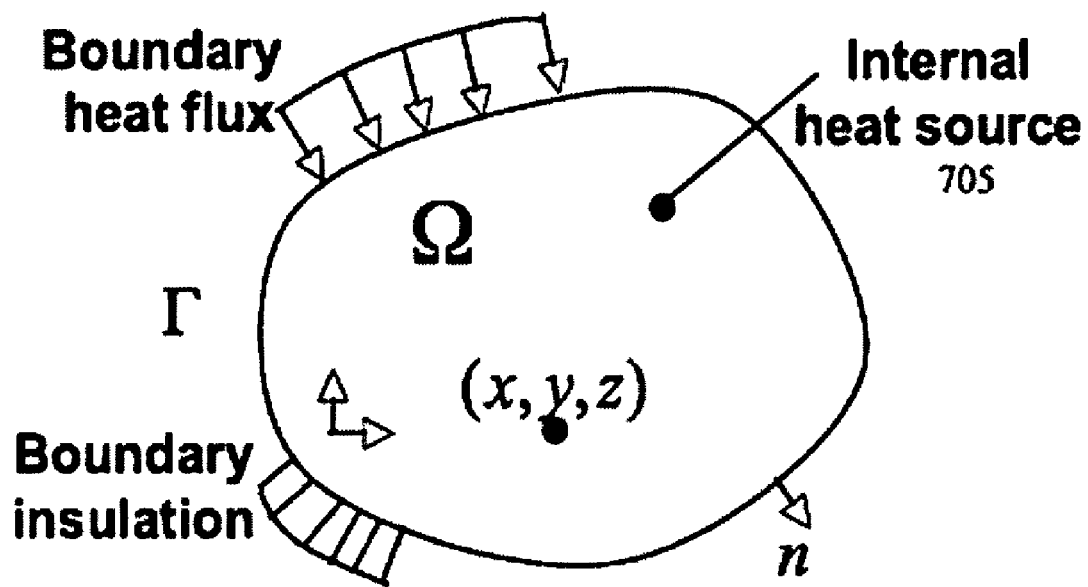
FIG. 7 illustrates a conceptual diagram of a heat source within a domain.

In these equations,

Ω is the multi-layer IC design volume where the temperature distribution is to be computed, $\Gamma_q$ is the boundary where the boundary condition is applied, as illustrated in FIG. 7, i and j are nodes in the volume, $N_i$ is the shape function associated with node i, x, y, and z are point coordinates in the region, T is temperature, g(x,y,z,T) is the steady state power density of a heat source 705 as the point heat source illustrated in FIG. 7, k(x,y,z,T) is the thermal conductivity, h is the heat transfer coefficient on the boundary through a specified package model to the ambient environment, and f is $h*T_a$, where $T_a$ is the ambient temperature.

The steady-state power density term g(x,y,z,T) can be written as:

$$g(x,y,z,T) = g_i(x,y,z,T) + g_s(x,y,z,T) + g_l(x,y,z,T) \tag{8}$$

where $g_i(x,y,z,T)$ is the steady-state internal power density, $g_s(x,y,z,T)$ is the steady-state switching power density, and $g_l(x,y,z,T)$ is the steady-state leakage power density. Of these three power consumption components, $g_i$, $g_s$, and $g_l$, some embodiments only treat the leakage power consumption $g_l$ as temperature dependent. Other embodiments might also treat the switching power consumption and/or internal power consumption as temperature dependent.

The derivation of the temperature-dependent leakage power for a circuit module was described above. To compute the leakage power of a circuit module, the circuit module needs to have an associated temperature. The temperature of the circuit module is interpolated from the temperature of its neighboring nodes (e.g., as a weighted average based on the distance from the nodes of the brick that wholly contains the circuit module, or from the nodes of the two or more bricks that contain the circuit module).

The finite element equations (6)-(8) that were shown above are derived by discretizing the steady state heat flow equation:

$$\nabla \cdot [k(x,y,z,T) \nabla T(x,y,z)] = -g(x,y,z,T)$$

under the boundary condition $$k(x, y, z, T)\frac{\partial T(x, y, z)}{\partial n_i} + hT(x, y, z) = f(x, y, z),$$

where this steady state heat flow equation is a specific case of the more general heat flow equation $$\rho(x, y, z, T)C_p(x, y, z, T)\frac{\partial T(x, y, z, t)}{\partial t} = \nabla \cdot [k(x, y, z, T)\nabla T(x, y, z, t)] + g(x, y, z, T, t).$$

In these equations, again, x, y, and z are point coordinates in the region, t is time, $T(x,y,z,t)$ is instantaneous temperature at any point, $g(x,y,z,T,t)$ is the power density of a heat source 705 at a point, $k(x,y,z,T)$ is the thermal conductivity, $\rho(x,y,z,T)$ is the material density, $C_P(x,y,z,T)$ is the specific heat, h is the heat transfer coefficient on the boundary, and n is the outward direction of the boundary surface.

IV. Solving the Heat Flow Equation

As mentioned above, the process 400 computes (at 405 and 415) two coefficients α and β for each circuit module in the design, and uses these two coefficients to specify (at 415 and 420) a heat flow equation that is expressed partly in terms of exponential leakage power consumption models of the circuit modules. After defining the heat flow equation, the process 400 uses (at 425) a matrix solver to iteratively solve the heat flow equation.

Figure 8:
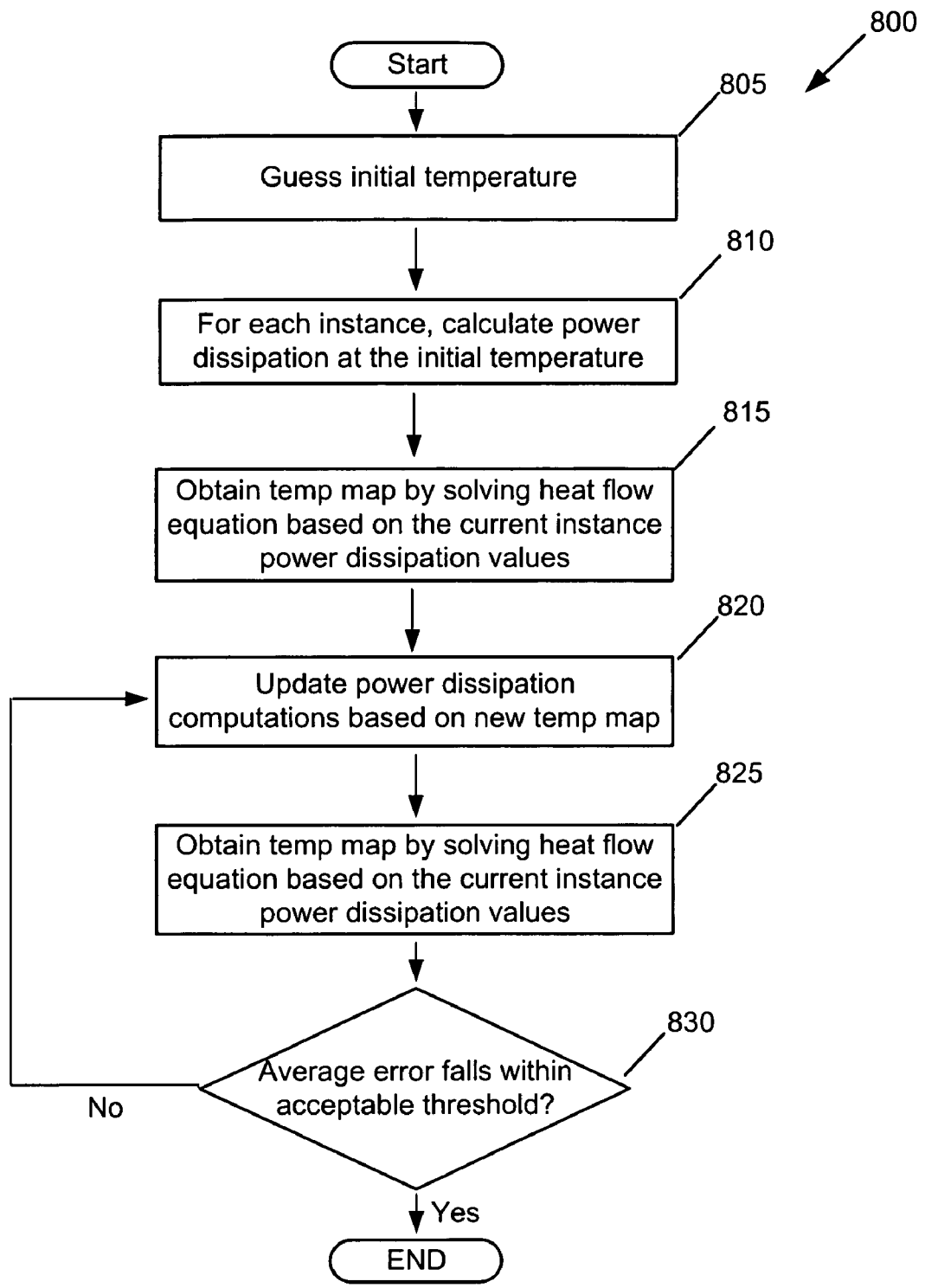
FIG. 8 illustrates a solving process that some embodiments use (at 425) to solve the heat flow equation.

FIG. 8 illustrates a solving process 800 that some embodiments use (at 425) to solve the heat flow equation. As shown in this figure, the process initially selects (at 805) an initial estimate for the temperature of several nodes in the design. As mentioned above, some embodiments divide the IC design layout into a number of bricks (also called elements) whose vertices are the nodes for which the temperatures are computed.

Next, the process calculates (at 810) the power dissipation of each circuit module based on the current temperature of the particular circuit module and its non-linear temperature-dependent power consumption model. As mentioned above, the process 400 identifies (at 415) an exponential power consumption model for each circuit module.

The process 800 then uses (at 815) these power dissipation values to solve the heat flow equation to produce a new temperature distribution. In some embodiments, the process uses a numerical matrix solver to produce the new temperature distribution. The matrix solver first factorizes the conductivity matrix C using LU or Cholesky factorization and then solves the equations via forward/backward substitution.

The solution to the heat flow equation is a vector of temperature values that correspond to the temperatures of the nodes of the bricks that divide the IC design. This vector provides an initial temperature distribution for the IC. The distribution gives the steady-state temperature on the IC as a function of spatial coordinates x, y, and z given the power dissipation values that were calculated (at 810) based on the initial temperature guessed at 805.

The process next updates (at 820) the power dissipation values using the temperature values produced at 815. The process calculates (at 820) the power dissipation of each circuit module again based on the interpolated temperature of the particular circuit module (i.e., the temperature interpolated from the current temperature of its nearby nodes) and its non-linear temperature-dependent power consumption model (e.g., its exponential power consumption model). These new power dissipation values are based on the calculated temperature distribution as opposed to the initial estimated temperature distribution.

After 820, the process uses (at 825) the power dissipation values calculated at 820 to solve the heat flow equation to produce a new temperature distribution. As before, the process uses a numerical matrix solver to produce the new temperature distribution. The solution to the heat flow equation is again a vector of temperature values that correspond to the temperatures of the different nodes of the bricks that divide the IC design. This vector provides a calculated temperature distribution for the IC. This distribution again provides the steady-state temperature on the IC as a function of spatial coordinates x, y, and z given the power dissipation values that were calculated (at 820).

Next, the process compares (at 830) the last two temperature distributions that it obtained by solving the heat flow equation. In the first iteration through 830, the process compares the temperature distribution computed at 815 with the temperature distribution computed in the first iteration through 825. In subsequent iterations through 830, the process compares the last two temperature distributions that were computed in the last two iterations through 825.

In some embodiments, the comparison of the two temperature distributions (at 830) entails a computation of the average difference between the temperature values at each node in the design layout in the two maps divided by the average temperature value on the new map. When the average error is within a particular threshold (e.g., less than a predefined threshold), the process ends and outputs the new temperature distribution.

However, when the average error computed at 830 is not within the threshold, the process 800 repeats operations 820, 825, and 830. Specifically, the process uses (at 820) the new temperature distribution to update the power dissipation values again, uses (at 825) the new power dissipation values to obtain a new temperature distribution, and then compares (at 830) the new temperature distribution with the prior temperature distribution to determine whether the average error falls within the predefined threshold.

As mentioned above, the process 800 continues until the difference between two subsequently calculated temperature distributions is small enough that, when compared at 830, the average error falls below the specified threshold. The solution computed in the final iteration through 825 is the temperature vector T that represents the temperature distribution across the IC design (i.e., the temperature of various nodes).

Figure 9:
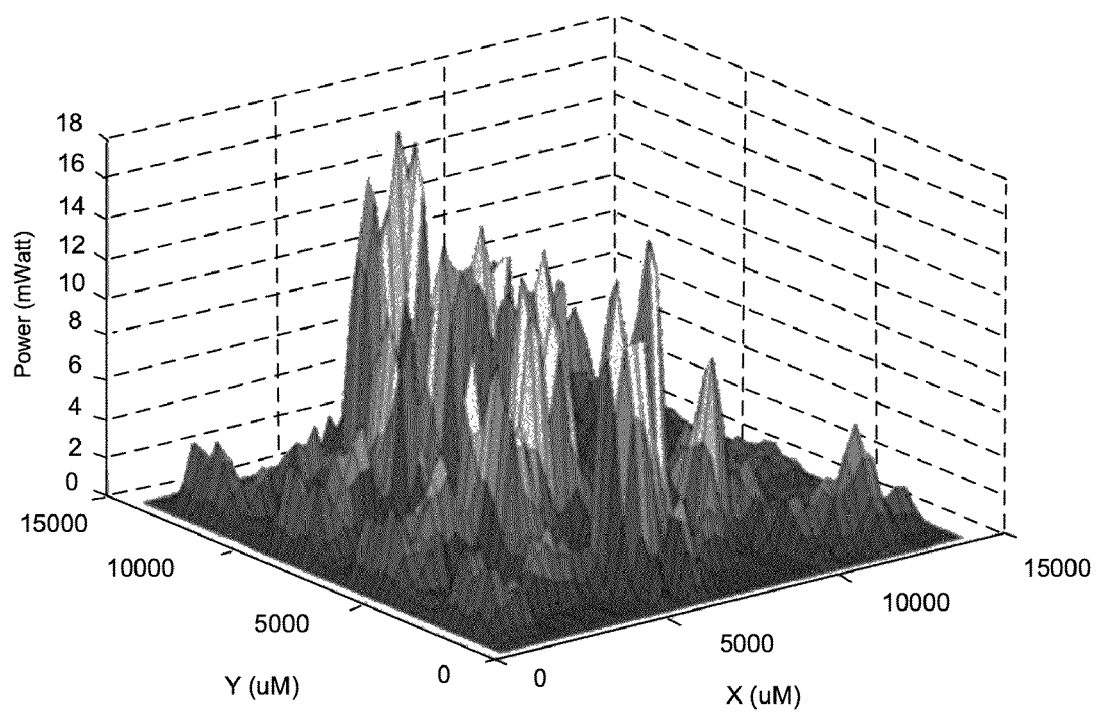
FIG. 9 illustrates a power distribution map for one of the layers of an IC.

The IC design's estimated power consumption can be computed by using this temperature distribution and the equations (6)-(8) that are described above. In addition, some embodiments use the temperature map obtained at 425 to obtain a power distribution map such as that of FIG. 9, which illustrates a map 900 for one of the layers of the IC. Similar to the temperature map, the power distribution map 900 plots total power consumption (along the z-axis) in milliwatts as a function of spatial coordinates x and y on a particular layer of the IC.

In addition to monitoring power consumption, the thermal analysis provided by processes 400 and 800 can be used to select the best packaging for a chip. For instance, the analysis allows a designer to select from several packages a cost effective package that prevents any section from overheating, avoids problematic temperature gradients, etc. Proper packaging can help keep a chip from overheating by conducting heat away from the chip. Sometimes better, but more expensive, packaging may be needed in order to prevent thermal runaway.

This analysis can also be used to perform better timing analysis, which is often dependent on the power consumption analysis. Temperature gradients on an IC can affect signal delays. Therefore, it is necessary to know the temperature distribution throughout the IC in order to compute accurate timing analysis.

The advantage of the above-described processes 400 and 800 is that they can be performed much more quickly than prior solutions, which separated out the thermal analysis and power analysis into separate programs that required numerous power-dissipation and thermal-analysis iterations.

Another advantage of these processes is that it is easy to detect thermal run-away. For instance, some embodiments quickly identify a thermal run-away when the average error computed by process 800 at 830 in one iteration is greater than the average error computed by process 800 at 830 in a prior iteration.

V. Computer System

Figure 10:
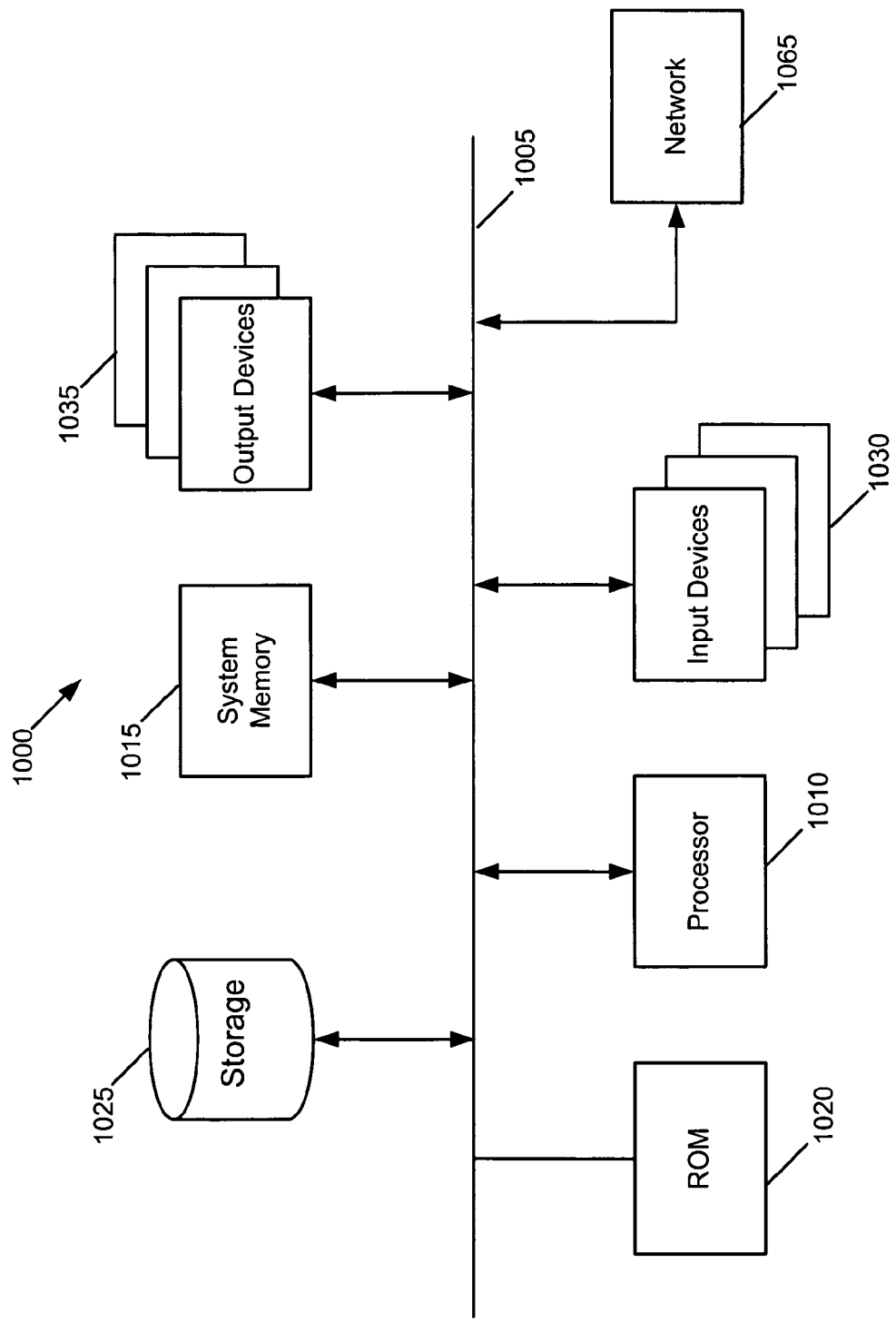
FIG. 10 conceptually illustrates a computer system with which some embodiments of the present invention are implemented.

FIG. 10 conceptually illustrates a computer system with which some embodiments of the present invention are implemented. Computer system 1000 includes a bus 1005, a processor 1010, a system memory 1015, a read-only memory 1020, a permanent storage device 1025, input devices 1030, and output devices 1035.

The bus 1005 collectively represents all system, peripheral, and chipset buses that communicatively connect the numerous internal devices of the computer system 1000. For instance, the bus 1005 communicatively connects the processor 1010 with the read-only memory 1020, the system memory 1015, and the permanent storage device 1025.

From these various memory units, the processor 1010 retrieves instructions to execute and data to process in order to execute the processes of the invention. The read-only memory 1020 stores static data and instructions that are needed by the processor 1010 and other modules of the computer system. The permanent storage device 1025, on the other hand, is a read-and-write memory device. This device is a non-volatile memory unit that stores instructions and data even when the computer system 1000 is off. Some embodiments of the invention use a mass-storage device (such as magnetic or optical disk and its corresponding disk drive) as the permanent storage device 1025. Other embodiments use a removable storage device (such as a floppy disk, and its corresponding disk drive) as the permanent storage device.

Like the permanent storage device 1025, the system memory 1015 is a read-and-write memory device. However, unlike storage device 1025, the system memory 1015 is a volatile read-and-write memory, such as a random access memory. The system memory stores some of the instructions and data that the processor needs at runtime. In some embodiments, the invention's processes are stored in the system memory 1015, the permanent storage device 1025, and/or the read-only memory 1020.

The bus 1005 also connects to the input and output devices 1030 and 1035. The input devices enable the user to communicate information and select commands to the computer system. The input devices 1030 include alphanumeric keyboards and cursor-controllers.

The output devices 1035 display images generated by the computer system. For instance, these devices might display a three-dimensional temperature map. The output devices include printers and display devices such as cathode-ray tubes or liquid crystal displays.

Finally, as illustrated in FIG. 10, the bus 1005 also couples computer 1000 to a network 1040 through a network adapter (not shown). In this manner, the computer can be part of a network of computers (such as a local area network, a wide area network, or an intranet) or a network of network (such as the Internet).

Any or all of the components of computer system 1000 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For instance, the process 400 computes two power dissipation values of each circuit module at two temperatures and then derives coefficients for the non-linear heat source model from these two values. In other embodiments, the process 400 might receive the coefficients of the non-linear leakage power model for a circuit module from a manufacturer or a developer of a circuit library. In such a situation, the process 400 might then only need one to compute one power dissipation value for a circuit module to formulate its heat flow equation.

Also, several embodiments described above treat only leakage power as the power dissipation component that is dependent on the temperature. As mentioned above, the total power dissipation in an IC is made up of leakage power, switching power, and internal power of the various circuit modules. Other embodiments may treat other components of the power dissipation (e.g., switching power and internal power) as temperature-dependent components. The temperature dependence of these other components might be specified through an exponential model or some other model. Thus, one of ordinary skill in the art would understand that the invention is not to be limited by the foregoing illustrative details, but rather is to be defined by the appended claims.

We claim:

1. A method for performing thermal analysis of an integrated circuit ("IC") design layout, the method comprising:
    specifying a plurality of non-linear temperature-dependent power equations to express leakage power of a plurality of circuit modules in the design layout, the non-linear equations defined based on power dissipation characteristics of the plurality of circuit modules at two temperatures, wherein at least one power equation expresses power dissipation of a circuit module at a particular temperature;
    defining a heat flow equation based on the specified power equations; and
    solving, by a computer, the heat flow equation to identify a temperature distribution for the design layout.

2. The method of claim 1, wherein at least one power equation relates to a leakage power of at least one circuit module, wherein the leakage power is temperature dependent.

3. The method of claim 1, wherein the non-linear equations are exponential equations.

4. A method for performing thermal analysis of an integrated circuit ("IC") design layout, the method comprising:
    specifying a plurality of non-linear temperature-dependent power equations to express leakage power of a plurality of circuit modules in the design layout, wherein at least one power equation expresses power dissipation of a circuit module at a particular temperature, the non-linear equations defined using power dissipation coefficients provided by a third party;
    defining a heat flow equation based on the specified power equations; and solving, by a computer, the heat flow equation to identify a temperature distribution for the design layout.

5. The method of claim 1, wherein solving the heat flow equation comprises using an iterative solver to find a solution.

6. The method of claim 1, wherein solving the heat flow equation comprises:
identifying an initial temperature distribution for the design layout as a current temperature distribution;
based on the current temperature distribution, computing temperature-dependent power dissipation values for the plurality of circuit modules in the design layout; and
solving the heat flow equation for the computed power dissipation values in order to identify a new current temperature distribution for the design layout.

7. The method of claim 6 further comprising iteratively:
computing, based on the current temperature distribution, temperature-dependent power dissipation values for the plurality of circuit modules in the design layout; and
solving the heat flow equation for the computed power dissipation values in order to identify a new current temperature distribution for the design layout.

8. A method for performing thermal analysis of an integrated circuit ("IC") design layout, the design layout comprising a plurality of circuit modules, the method comprising:
specifying a plurality of non-linear temperature-dependent power equations, wherein at least one power equation expresses power dissipation of a circuit module at a particular temperature, the non-linear equations defined based on power dissipation characteristics of the circuit module at two temperatures;
defining a heat flow equation based on the specified power equations;
identifying an initial temperature distribution for the design layout as a current temperature distribution;
iteratively:
computing, based on the current temperature distribution, temperature-dependent power dissipation values for the plurality of circuit modules in the design layout; and
solving, by a computer, the heat flow equation for the computed power dissipation values in order to identify a new current temperature distribution for the design layout; and
terminating the iterations after determining convergence of the identified temperature distributions.

9. A non-transitory computer readable medium storing a computer program for performing thermal analysis of an integrated circuit ("IC") design layout, the computer program comprising sets of instructions for:
specifying a plurality of non-linear temperature-dependent power equations to express leakage power of a plurality of circuit modules in the design layout, the non-linear equations defined based on power dissipation characteristics of the plurality of circuit modules at two temperatures, wherein at least one power equation expresses power dissipation of a circuit module at a particular temperature;
defining a heat flow equation based on the specified power equations; and
solving the heat flow equation to identify a temperature distribution for the design layout.

10. The non-transitory computer readable medium of claim 9, wherein at least one power equation relates to a leakage power of at least one circuit module, wherein the leakage power is temperature dependent.

11. The non-transitory computer readable medium of claim 9, wherein the non-linear equations are exponential equations.

12. A non-transitory computer readable medium storing a computer program for performing thermal analysis of an integrated circuit ("IC") design layout, the computer program comprising sets of instructions for:
specifying a plurality of non-linear temperature-dependent power equations to express leakage power of a plurality of circuit modules in the design layout, wherein at least one power equation expresses power dissipation of a circuit module at a particular temperature, the non-linear equations defined using power dissipation coefficients provided by a third party;
defining a heat flow equation based on the specified power equations; and
solving the heat flow equation to identify a temperature distribution for the design layout.

13. The non-transitory computer readable medium of claim 9, wherein the set of instructions for solving the heat flow equation comprises a set of instructions for using an iterative solver to find a solution.

14. The non-transitory computer readable medium of claim 9, wherein the set of instructions for solving the heat flow equation comprises sets of instructions for:
identifying an initial temperature distribution for the design layout as a current temperature distribution;
based on the current temperature distribution, computing temperature-dependent power dissipation values for the plurality of circuit modules in the design layout; and
solving the heat flow equation for the computed power dissipation values in order to identify a new current temperature distribution for the design layout.

15. The non-transitory computer readable medium of claim 14, wherein the computer program further comprises sets of instructions for iteratively:
computing, based on the current temperature distribution, temperature-dependent power dissipation values for the plurality of circuit modules in the design layout; and
solving the heat flow equation for the computed power dissipation values in order to identify a new current temperature distribution for the design layout.

16. A non-transitory computer readable medium storing a computer program for performing thermal analysis of an integrated circuit ("IC") design layout, the design layout comprising a plurality of circuit modules, the computer program comprising sets of instructions for:
specifying a plurality of non-linear temperature-dependent power equations, wherein at least one power equation expresses power dissipation of a circuit module at a particular temperature, the non-linear equations defined based on power dissipation characteristics of the circuit module at two temperatures;
defining a heat flow equation based on the specified power equations;
identifying an initial temperature distribution for the design layout as a current temperature distribution;
iteratively:
computing, based on the current temperature distribution, temperature-dependent power dissipation values for the plurality of circuit modules in the design layout; and
solving the heat flow equation for the computed power dissipation values in order to identify a new current temperature distribution for the design layout; and
terminating the iterations after determining convergence of the identified temperature distributions.

17. The method of claim 1, wherein the particular temperature is interpolated from temperatures at a plurality of locations near the circuit module.

18. The method of claim 17, wherein the plurality of locations are located on a grid that divides the design layout into a plurality of sub-regions.

19. The method of claim 8 further comprising generating a power consumption report for the design layout that provides power consumption of each of the plurality of circuit modules of the design layout.

20. The method of claim 8, wherein determining the convergence of the identified temperature distributions is based on a comparison of temperature values between the current temperature distribution and a preceding temperature distribution.

21. The method of claim 8, wherein the convergence occurs when an average error of temperature values between the current temperature distribution and a preceding temperature distribution is within a particular threshold.

22. The method of claim 8, wherein specifying the plurality of power equations comprises defining a plurality of non-linear equations to express leakage power of the plurality of circuit modules in the design layout.

23. The method of claim 22, wherein the non-linear equations are defined based on power dissipation characteristics of the circuit modules at two temperatures.

24. The non-transitory computer readable medium of claim 9, wherein the design layout comprises a plurality of same-sized blocks, each block comprising a plurality of vertices, the temperature distribution identifying temperature values of vertices of the plurality of same-sized blocks.

25. The non-transitory computer readable medium of claim 24, wherein the particular temperature is interpolated from temperature values of vertices near the circuit module.

26. The non-transitory computer readable medium of claim 16, wherein the convergence occurs when an average error of temperature values between the current temperature distribution and a preceding temperature distribution is within a particular threshold.

27. The non-transitory computer readable medium of claim 16, wherein the convergence occurs when a difference between the current temperature distribution and a preceding temperature distribution is less than a particular threshold.

28. The non-transitory computer readable medium of claim 16, wherein the particular temperature is interpolated from temperatures at a plurality of locations near the circuit module.

29. The non-transitory computer readable medium of claim 28, wherein the plurality of locations are located on a grid that divides the IC design layout into a plurality of sub-regions.

* * * * *